(12) United States Patent
Bingham

(10) Patent No.: US 8,470,086 B1
(45) Date of Patent: Jun. 25, 2013

(54) COMPOSITION FOR APPLICATION AS A COLORING AGENT TO MORTAR

(76) Inventor: Erin Cole Bingham, McFarland, WI (US)

( * ) Notice: Subject to any disclaimer, the term of this patent is extended or adjusted under 35 U.S.C. 154(b) by 58 days.

(21) Appl. No.: 13/175,848

(22) Filed: Jul. 2, 2011

(51) Int. Cl.
*C09D 17/00* (2006.01)
(52) U.S. Cl.
USPC ............ 106/476; 106/477; 106/493; 106/504
(58) Field of Classification Search
USPC .......................... 106/778, 476, 477, 493, 504
See application file for complete search history.

(56) References Cited

U.S. PATENT DOCUMENTS

| | | | |
|---|---|---|---|
| 3,189,469 A | 6/1965 | Littler | |
| 4,239,540 A | 12/1980 | His-Chu | |
| 4,495,319 A | 1/1985 | Sackin et al. | |
| 5,421,875 A * | 6/1995 | Chambers et al. | ............ 106/243 |
| 7,612,157 B2 | 11/2009 | Mosquet et al. | |

\* cited by examiner

*Primary Examiner* — Paul Marcantoni
(74) *Attorney, Agent, or Firm* — Loyd W. Bonneville

(57) ABSTRACT

A mixture of linseed oil, paint thinner and pigment, blended in specified combination, is prepared for application to mortar—particularly old mortar—as a coloring agent. The mixture is suitable for use at repair sites comprising both old mortar and new mortar applied in making repairs, provided the new mortar has been allowed to age for at least 60 days.

2 Claims, No Drawings

COMPOSITION FOR APPLICATION AS A COLORING AGENT TO MORTAR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention
Aged mortar coloring agent; dye
2. Description of Related Art The word comprise may be construed in any one of three ways herein. A term used to describe a given object is said to comprise it, thereby characterizing it with what could be considered two-way equivalency in meaning. Thus, it is stated that the subject matter hereof comprises a mixture of ingredients for use as a suitable coloring agent for aesthetic application to mortar meaning that the latter is in fact the former and the former, the latter. The term comprise may also be characterized by what might be considered one-way equivalency, as when it is stated herein that light reflective dye might comprise an additional ingredient of a sought-after property for a prior art mixture. This use of the word has a generic sense to it. That is, light reflective paint will always amount to an added ingredient of the prior art mixture but an added ingredient may be light reflective paint in one case but something else—a special dispersing agent, or vehicle, for instance—in another. However, the word comprise may also be used to describe a feature which is part of the structure or composition of a given object. Thus, it is said fatty acids share the property of comprising a carboxyl group (COON). The meaning in the respective cases is clear from context, however. Accordingly, modifying words to clarify which of the three uses is the intended one seem unnecessary.

The prior art is replete with mixtures or compositions relying upon adhesion or materials bonding for masonry purposes as well as upon acceptable substance curing and surface protection for the sake of long term endurance. Exemplary are U.S. Pat. No. 2,928,752 issued to Felletschin; U.S. Pat. No. 3,189,469 issued to Littler, et. al.; U.S. Pat. No. 4,239,540 issued to Hsin-Chu; U.S. Pat. No. 4,495,319 issued to Sackin, et. al.; and U.S. Pat. No. 7,612,157 issued to Mosquet, el. al. All comprise a paraffin wax, fatty acids, emulsions and, possibly, additional substances conferring upon the mixture some sought-after variable property. For example, light reflective paint might comprise such an additional ingredient. Linseed oil is a frequently included ingredient. In general, the properties of those mixtures are directed to prolonging the curing time of the concrete or masonry while avoiding the mixture's deactivation. The Littler and Sackin preparations contain reflective pigments to diminish the sun's role during that stage. Mosquet comprises a latex substitute thought to allay chemical instability and otherwise inherent environmental problems. All require application during the wet stage before curing is complete and may, thus, be considered part of the synthesis of the masonry structure they are applied to. Mixtures or compositions dedicated merely to changing the hue, shade or color of mortar in particular are distinguishable from those directed to adhesion or product strengthening, however, although some ingredients are common in both in one proportion or another. Although aesthetic mixtures or compositions of this latter sort may, too, be applied during the wet stage of construction, it is more conveniently accomplished after curing and setting has occurred—even years afterward upon very old mortar.

While the prior art reflects valid contributions to masonry in the way of strengthening bonding applications of mortar to brick or stone, it would be highly beneficial to the industry to provide a coloring agent which endures well and can be applied efficiently, quickly and inexpensively to beautify the mortar of older existing masonry constructions. A desirable mixture would be one which, when applied to new mortar patched in for repairs—that which is 60 days or more of age—blends perfectly with the old mortar adjoining the patch-work such that one would not readily observe any line of demarcation at the site. For one reason or another, masons have thus far encountered difficulty along those lines.

BRIEF SUMMARY OF THE INVENTION

Occasionally concrete develops cracks over a period of time and mortar chips out, separates from or simply wears down, losing its previous bond with structural pieces of masonry or stone. Following a proper repair protocol, masonry joints may be tuck-pointed. Oftentimes, those undertakings must be done upon edifices and other constructions intended to be aesthetically pleasing—the walls of one's home, for instance. It is an unfortunate consequence, however, that one can see where the repairs were made due to differences in color and texture between the new and the old. A concoction is devised herein which hides that visual disparity when applied uniformly to the old mortar adjoining the repair site and the mortar employed in the repairs which newly applied mortar has aged for at least 60 days.

The desired mixture utilizes ingredients well known and readily available by reason of curative and protective application to masonry constructions, albeit varying the otherwise more familiar constituency thereof in order to provide aesthetically suitable coloration or hue thereto—one rendering a visually uniform appearance to the repair site.

BRIEF DESCRIPTION OF THE SEVERAL VIEWS OF THE DRAWINGS

None required.

DETAILED DESCRIPTION OF THE INVENTION

The subject matter hereof comprises a mixture of ingredients for use as a suitable coloring agent for aesthetic application to mortar—particularly, but not necessarily exclusively, mortar of 60 days age or greater.

The mixture, or composition, comprises as ingredients linseed oil, mineral spirits and a pigment of any desired hue. The pigment is one which may generally be regarded as "oil based".

For purposes of discussion, linseed oil, a triglyceride and common commercial product, requires little additional explanation as to its own composition. However, it is useful to observe that its contents further comprise approximately 7% by weight saturated palmitic acid, 18.5-22% mono-unsaturated oleic acid, 14.2-17% doubly unsaturated linoleic acid and 51.9-55.2% triply unsaturated linolenic acid, the fatty acids sharing a carboxyl group (COOH) as a chemical property.

Linoleic acid, a doubly unsaturated component, itself a fairly commonly recognized substance, should be distinguished from fairly closely related linolenic acid, which is triply unsaturated.

Oleic acid, a mono-unsaturated component, is also fairly common in the commercial realm as well as in that of biochemistry.

Similarly, palmitic acid, a saturated component, is also a familiar composition in the field.

These four make up the whole of the linseed oil ingredient in the foregoing proportions. In any event, linseed oil may be conveniently referred to with understood recognition in its own right, without undue further consideration for those more particularized constituents.

As with the other ingredients, mineral spirits is also widely known, not only in the field but to almost all homeowners, comprising a mixture of aliphatic hydrocarbons together with aromatic hydrocarbons. The term aliphatic hydrocarbon, often referred to as a fat, refers to a chemical structure which may either be saturated or unsaturated. The term aromatic, on the other hand, refers to a structure of considerable stability arising from what is chemically referred to as "resonance" of which the benzene ring is exemplary. While cyclic forms may be taken by either aliphatic or aromatic variants, those comprising both are known as alicyclic.

The mixture or composition which is the subject of this application comprises in general the following aliquot portions: 2 parts pigment; 9 parts linseed oil and 9 parts mineral spirits. Converted into percentages, the pigment thus comprises approximately 10% by weight thereof; the linseed oil, 45% by weight thereof and the mineral spirits also 45% by weight thereof. However, the ingredients may be permitted to vary somewhat such that they may be expressed as an acceptable range of composition wherein the portions are allowed to vary plus or minus 3%. Thus, it would be appropriate to express a the composition as follows: The pigment representing a range of 9.7-10.3% of the mixture, the linseed oil, 43.65-46.35% thereof and the mineral oil also 43.65-46.35% thereof.

The inventor hereby claims:

1. A composition for application as a coloring agent to mortar of age 60 days or greater, the composition comprising as ingredients a pigment, linseed oil and mineral spirits, the linseed oil comprising 7 wt % palmitic acid, 18.5-22.6 wt % oleic acid unsaturated in comprising one double bond, 14.2-17 w % linoleic acid unsaturated in comprising two or more double bonds and 51.9-55.2 wt % linolenic acid unsaturated in comprising one or more triple bonds; the mineral spirits comprising a mixture of aliphatic and acyclic hydrocarbons together with aromatic hydrocarbons; the pigment comprising between 9.7-10.3 wt % of the entire composition, the linseed oil comprising between 43.65-46.35 wt % of the entire composition, and the mineral spirits between 43.65-46.35 wt % of the entire composition, the aliquot portions of those ingredients of the composition thereby equating to a 20 part blend of approximately two parts pigment, 9 parts linseed oil and 9 parts mineral spirits.

2. The composition for application as a coloring agent to-mortar of age 60 days or greater according to claim 1 wherein the coloring thereof is such as to achieve uniformity in appearance between pre-existing mortar and recently applied mortar of 60 days or more in age.

\* \* \* \* \*